(12) United States Patent
Clayton et al.

(10) Patent No.: US 8,622,285 B2
(45) Date of Patent: Jan. 7, 2014

(54) CONTEXT BASED SCANNING AND READING SYSTEMS AND METHODS

(75) Inventors: Richard M. Clayton, Manorville, NY (US); Alexander R. Spiro, Astoria, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/329,370

(22) Filed: Dec. 19, 2011

(65) Prior Publication Data

US 2013/0153650 A1 Jun. 20, 2013

(51) Int. Cl.
*G06F 17/00* (2006.01)
(52) U.S. Cl.
USPC .......................................... 235/375; 235/487
(58) Field of Classification Search
USPC ..................................... 235/375, 487, 472.01
See application file for complete search history.

(56) References Cited

U.S. PATENT DOCUMENTS

| | | | |
|---|---|---|---|
| 7,837,094 B2 | 11/2010 | Rhoads | |
| 2004/0181467 A1* | 9/2004 | Raiyani et al. | 705/28 |
| 2005/0082370 A1 | 4/2005 | Frantz et al. | |
| 2006/0208892 A1 | 9/2006 | Ehrman et al. | |
| 2008/0017709 A1 | 1/2008 | Kennedy | |
| 2009/0224040 A1 | 9/2009 | Kushida et al. | |
| 2009/0276307 A1* | 11/2009 | Griffith et al. | 705/14.19 |
| 2011/0034179 A1* | 2/2011 | David et al. | 455/456.1 |
| 2011/0176705 A1 | 7/2011 | Kato | |
| 2012/0022930 A1* | 1/2012 | Brouhard | 705/14.22 |

FOREIGN PATENT DOCUMENTS

| | | |
|---|---|---|
| DE | 10103266 A1 | 4/2002 |
| EP | 1313042 A1 | 5/2003 |
| EP | 2063385 A2 | 5/2009 |
| GB | 2097330 A | 11/1982 |
| WO | 0000300 A1 | 1/2000 |
| WO | 0230583 A2 | 4/2002 |
| WO | 2009048275 A2 | 4/2009 |

OTHER PUBLICATIONS

International Search Report and Written Opinion mailed Apr. 8, 2013 in counterpart application PCT/US2012/067947.

* cited by examiner

*Primary Examiner* — Edwyn Labaze

(57) ABSTRACT

Context based scanning and reading systems and methods are provided with an end-to-end framework for receiving information and performing a plurality of different actions based thereon. An end-to-end framework includes one of scanning and reading an item to obtain a first set of information based thereon, presenting the first set of information in context, obtaining a plurality of actions in context based on the first set of information in context, and selecting one of the plurality of actions in context based on criteria. A system includes at least one readable device associated with an item, at least one mobile device configured to scan the at least one readable device, and an end-to-end framework operable on the at least one mobile device to obtain information from the at least one readable device and present the information and associated actions based on a context.

13 Claims, 7 Drawing Sheets

US 8,622,285 B2

CONTEXT BASED SCANNING AND READING SYSTEMS AND METHODS

FIELD OF THE DISCLOSURE

The present disclosure relates generally to bar code scanning, Radio Frequency Identification (RFID) reading, and the like, and more particularly to context based scanning and reading systems and methods providing an end-to-end framework for receiving information and performing a plurality of different actions based thereon.

BACKGROUND

Radio Frequency Identification (RFID), one-dimensional (1D) barcodes, two-dimensional (2D) barcodes, and the like are proliferating in a variety of applications including retail, warehouse, point-of-sale, supply chain, and the like. Conventionally, devices, such as RFID readers, bar code scanners, and other mobile devices with functionality incorporated therein, are configured to read and/or scan information and perform possible actions based thereon. However, conventional solutions are hard-coded, domain-specific solutions. By hard-coded, the conventional solutions are not adaptable and operate exactly as preprogrammed, and by domain-specific, the conventional solutions do not enable interaction outside of a defined domain.

Accordingly, there is a need for context based scanning and reading systems and methods.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
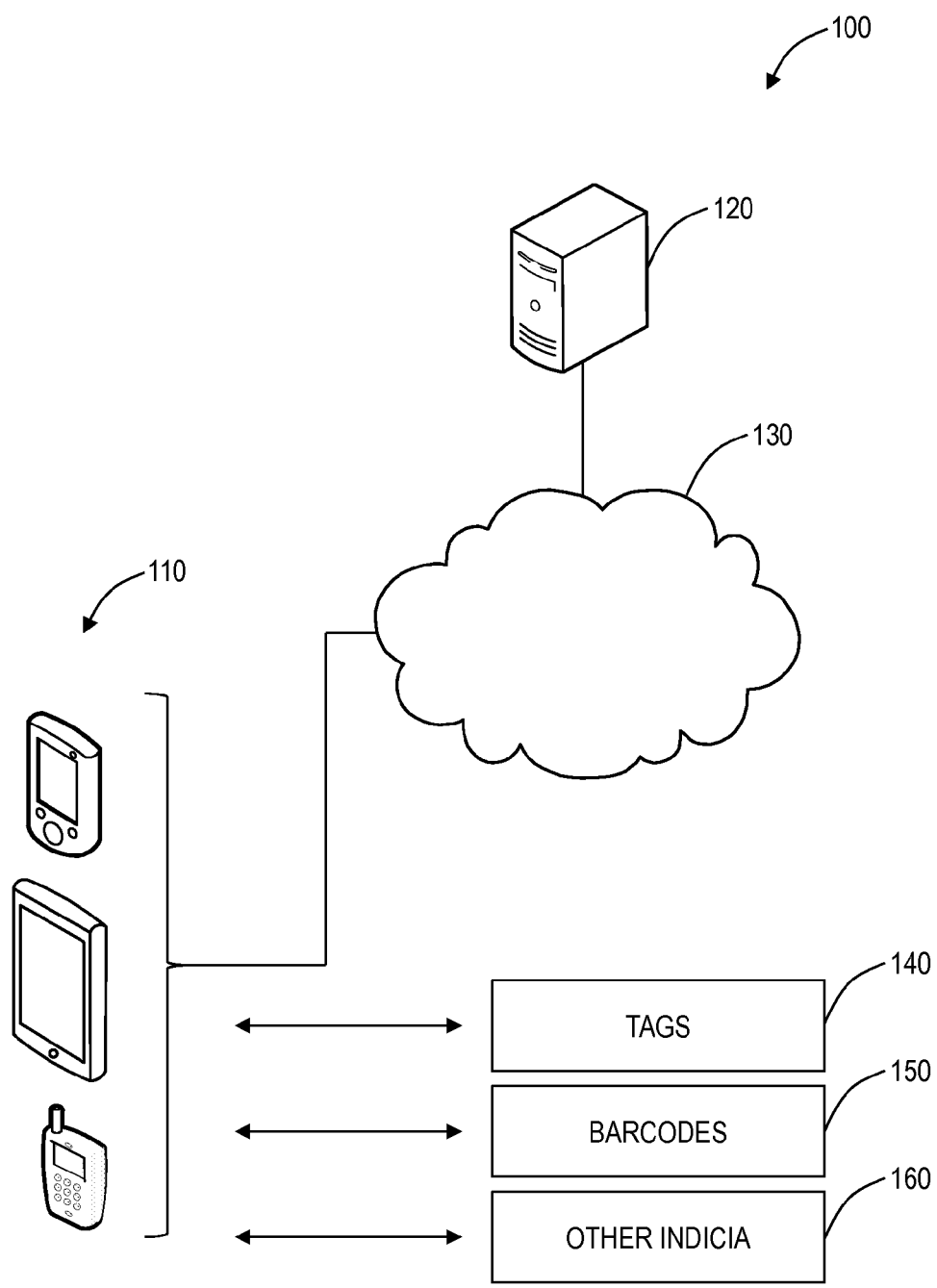
FIG. 1 is a diagram of a context based system for an end-to-end framework in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, context based scanning and reading systems and methods are provided with an end-to-end framework for receiving information and performing a plurality of different actions based thereon. An end-to-end framework includes one of scanning and reading an item to obtain a set of information such as data and symbology based thereon, presenting the set of information in context, obtaining a plurality of actions in context based on the set of information in context, and selecting one of the plurality of actions in context based on criteria. A system includes at least one readable device associated with an item, location, and the like, at least one mobile device configured to scan the at least one readable device, and an end-to-end framework operable on the at least one mobile device to obtain information from the at least one readable device and present the information and associated actions based on a context.

A mobile device includes a reader and/or a scanner, a network interface, a data store, and a processor, wherein each of the one of the reader and the scanner, the network interface, the data store, and the processor are communicatively coupled therebetween. The processor is configured to obtain information from an item using the one of the reader and the scanner, present the information to an output interface of the mobile device, and obtain a plurality of actions in context based on the information in context.

Referring to FIG. 1, in an exemplary embodiment, a diagram illustrates a context based system 100 for an end-to-end framework. The context based system 100 includes, for example, one or more mobile devices 110 which optionally connect to a server 120 through a network 130. Variously, the mobile devices 110 are configured to interact with tags 140, barcodes 150, and any other electronic, optical, wireless, etc. indicia mechanisms 160. The tags 140, the barcodes 150, and the other mechanisms 160 are deployed in a geographic region such as a store, warehouse, file room, stock room, etc. and are typically affixed, disposed on, attached to, and/or integrated with objects. In an exemplary embodiment, the tags 140 may include RFID tags which communicate wirelessly with the mobile devices 110. In another exemplary embodiment, the barcodes 150 may include 1D or 2D barcodes where the 1D or 2D refers to a mechanism for encoding data on the barcodes 150. The barcodes 150 are configured to be scanned optically by the mobile devices 110. Alternatively, the other mechanisms 160 may include any mechanism to communicate data with the mobile devices 110. As described herein, the tags 140, the barcodes 150, and the other mechanisms 160 may be referred to as readable devices, i.e. these are electronically/optically read devices to obtain information in context with the information being associated with an associated object, item, location, etc.

The context based system 100 includes the framework operating on the mobile devices 110 and the tags 140, the barcodes 150, and the other mechanisms 160. Optionally, the server 120 and the network 130 are utilized in the framework. The framework could reside on the mobile device 110, or it could reside on the server 120 (e.g., using the mobile device 110 for input/output) or it could be a combination of both. The framework allows an end-user with a mobile device 110 to scan and/or read information from the devices 140, 150, 160, and to have most important or relevant information displayed along with access to appropriate actions. For example, assume a mobile device 110 reads an arbitrary barcode 150, and the mobile device 110 may display important information associated with that barcode 150 (or the underlying physical object associate therewith). The display information may be displayed along with access to appropriate actions which may be taken in context meaning the actions apply to some aspect of the scanned/read item or one levels deeper, an aspect of the aspect. This same framework supports plug-ins (typically on the server 120) to provide this user experience for an arbitrary and extensible set of the tags 140, the barcodes 150, and the other mechanisms 160.

The framework provides available actions associated with context derived from the tags 140, the barcodes 150, and the other mechanisms 160 (or associated underlying physical object and its attributes). For example, the framework provides the actions by finding them looking at context information and the actions available for those pieces of context information. The actions may include creation of tasks, report of problems, request for information, etc. Most of the actions likely would be associated with the physical object, for example, so for a shelf label the actions might be: create task for replenishment; create task for refacing or tidying up the presentation of the shelf/rack; report damage to shelf or items on shelf; request additional business information for the product: weekly sales, deliveries, etc; look at stock levels in nearby stores; and the like. In some exemplary embodiments, the action may not be directly associated with the object, but may use other context information. For example with a shelf scan or read, there could be an action to create a cleanup task for the far end of an aisle, where this location is automatically derived from the location of one of the tag 140, the barcode 150, and the other mechanism 160 associated with the shelf label. The action might also be to start a task associated with the item that was just scanned and/or read. Also, any of the information/actions could be provided by the customer to meet their specific needs rather than preprogrammed, i.e. the information/actions is a flexible, programmable framework. The exposed information and actions can also take into account the identity and permissions associated with the user so that only information and actions meaningful to the user are presented. Note, formatting, order and other presentation aspects may be configurable based on a number of factors including role, area of store, time, etc.

In operation, the mobile devices 110 include a framework application for receiving information from the tags 140, the barcodes 150, and the other mechanisms 160, displaying the information, and interacting with the information for providing context based actions. The network 130 may include a local area network (LAN), a wide area network (WAN), a wireless LAN (WLAN), a cellular data network, a virtual private network (VPN), the Internet, and the like. The mobile devices 110 may be configured to communicate with one another and with the server 120 via the network 130. In an exemplary embodiment, the framework application is operated across the mobile devices 110 and the server 120 through the network. In another exemplary embodiment, the framework application is operated across the mobile devices 110 interconnected therebetween through the network 130. In yet another exemplary embodiment, the framework application is operated on the mobile device 110 in an offline manner which includes obtaining information from the server 120 through the network 130 in an aperiodic fashion, i.e. not in real time.

Figure 2:
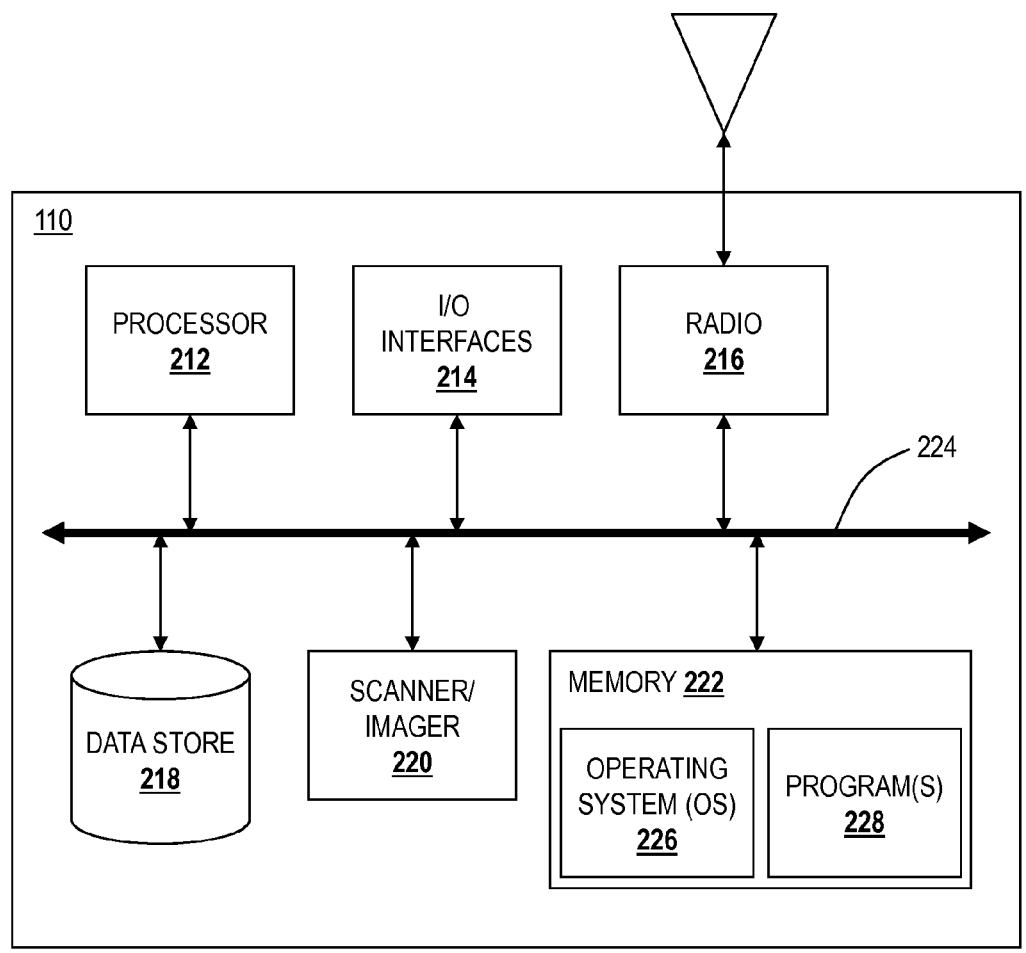
FIG. 2 is a block diagram of a mobile device which may be used in the system of FIG. 1 or the like in accordance with some embodiments.

Referring to FIG. 2, in an exemplary embodiment, a block diagram illustrates a mobile device 110, which may be used in the system 100 or the like. The mobile device 110 can be a digital device that, in terms of hardware architecture, generally includes a processor 212, input/output (I/O) interfaces 214, a radio 216, a data store 218, a scanner/imager 220, and memory 222. It should be appreciated by those of ordinary skill in the art that FIG. 2 depicts the mobile device 210 in an oversimplified manner, and a practical embodiment may include additional components and suitably configured processing logic to support known or conventional operating features that are not described in detail herein. The components (212, 214, 216, 218, 220, and 222) are communicatively coupled via a local interface 224. The local interface 224 can be, for example but not limited to, one or more buses or other wired or wireless connections, as is known in the art. The local interface 224 can have additional elements, which are omitted for simplicity, such as controllers, buffers (caches), drivers, repeaters, and receivers, among many others, to enable communications. Further, the local interface 224 may include address, control, and/or data connections to enable appropriate communications among the aforementioned components.

The processor 212 is a hardware device for executing software instructions. The processor 212 can be any custom made or commercially available processor, a central processing unit (CPU), an auxiliary processor among several processors associated with the mobile device 110, a semiconductor-based microprocessor (in the form of a microchip or chip set), or generally any device for executing software instructions. When the mobile device 110 is in operation, the processor 212 is configured to execute software stored within the memory 222, to communicate data to and from the memory 222, and to generally control operations of the mobile device 210 pursuant to the software instructions. In an exemplary embodiment, the processor 212 may include a mobile optimized processor such as optimized for power consumption and mobile applications. The I/O interfaces 214 can be used to receive user input from and/or for providing system output. User input can be provided via, for example, a keypad, a touch screen, a scroll ball, a scroll bar, buttons, and the like. System output can be provided via a display device such as a liquid crystal display (LCD), touch screen, and the like. The I/O interfaces 214 can also include, for example, a serial port, a parallel port, a small computer system interface (SCSI), an infrared (IR) interface, a radio frequency (RF) interface, a universal serial bus (USB) interface, and the like. The I/O interfaces 214 can include a graphical user interface (GUI) that enables a user to interact with the mobile device 110 and operate the framework application.

The radio 216 enables wireless communication to an external access device or network. Any number of suitable wireless data communication protocols, techniques, or methodologies can be supported by the radio 216, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. In an exemplary embodiment, the radio 216 with other components in the mobile device 110 may cooperatively operate as an RFID reader configured to interrogate the tags 140 for interaction with the framework.

The data store 218 may be used to store data. The data store 218 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 218 may incorporate electronic, magnetic, optical, and/or other types of storage media. The scanner/imager 220 may include a video and/or image capture device, i.e. a video camera, a camera, a barcode scanner, etc. In an exemplary embodiment, the scanner/imager 220 with other components in the mobile device 110 may cooperatively operate as a barcode scanner to scan the barcodes 150 for interaction with the framework.

The memory 222 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 222 may incorporate electronic, magnetic, optical, and/or other types of storage media. Note that the memory 222 may have a distributed architecture, where various components are situated remotely from one another, but can be accessed by the processor 212. The software in memory 222 can include one or more software programs, each of which includes an ordered listing of executable instructions for implementing logical functions. In the example of FIG. 2, the software in the memory system 222 includes a suitable operating system (O/S) 226 and programs 228. The operating system 226 essentially controls the execution of other computer programs, and provides scheduling, input-output control, file and data management, memory management, and communication control and related services. The programs 228 may include various applications, add-ons, etc. configured to provide various end user functionality with the mobile device 110. In a typical example, the end user typically uses one or more of the programs 228 along with a network such as the system 100. In an exemplary embodiment, the framework may be included in the programs 228.

Figure 3:
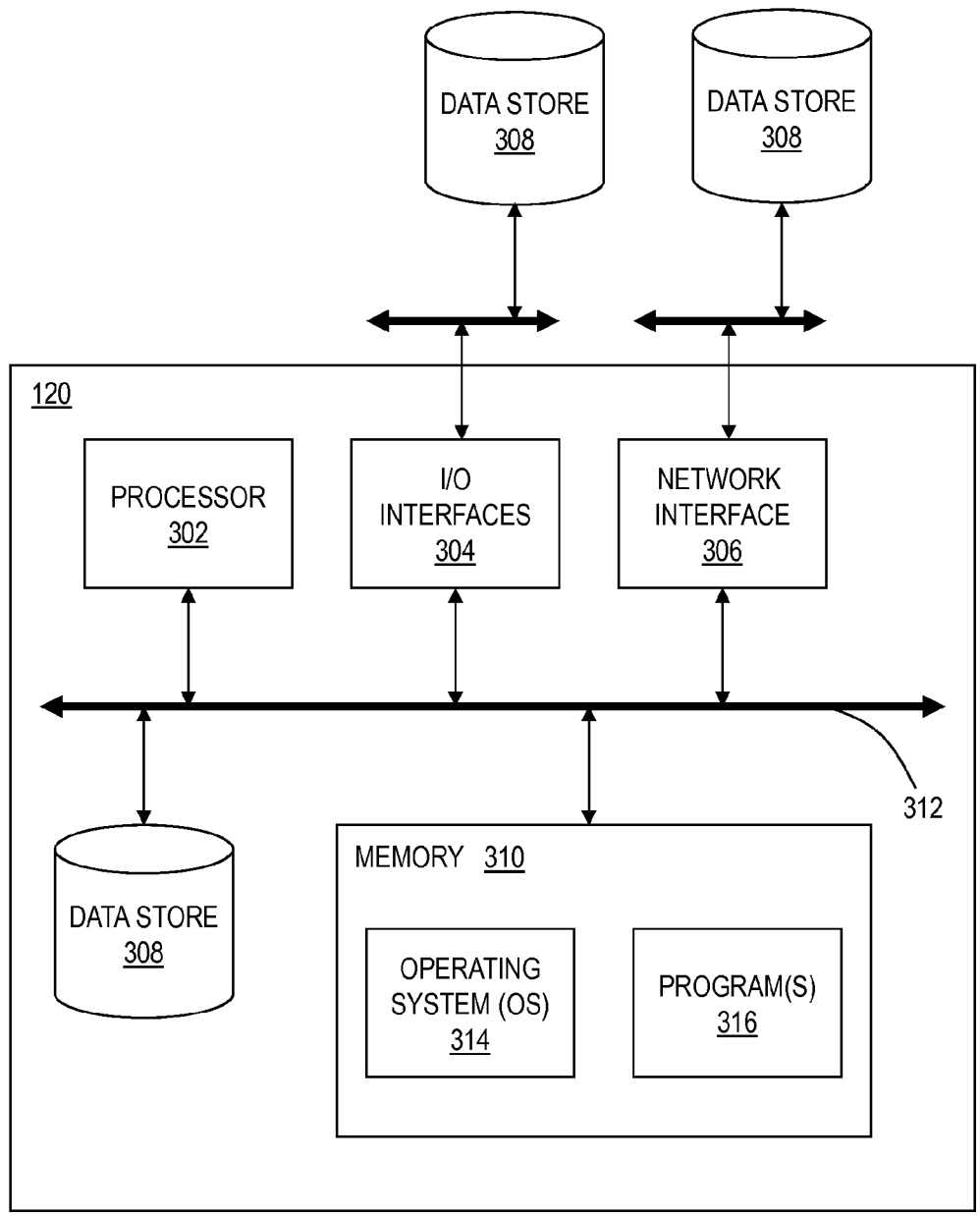
FIG. 3 is a block diagram of a server which may be used in the system of FIG. 1 or the like in accordance with some embodiments.

Referring to FIG. 3, in an exemplary embodiment, a block diagram illustrates a server 120 which may be used in the system 100. The server 120 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 120 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 120 is in operation, the processor 302 is configured to execute software stored within the memory 310, to communicate data to and from the memory 310, and to generally control operations of the server 120 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 120 to communicate on a network, such as the Internet, the network 130, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 120. Additionally in another embodiment, the data store 308 may be located external to the server 120 such as, for example, an external hard drive connected to the I/O interfaces 304 (e.g., SCSI or USB connection). In a further embodiment, the data store 308 may be connected to the server 120 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein with respect to the framework.

Figure 4:
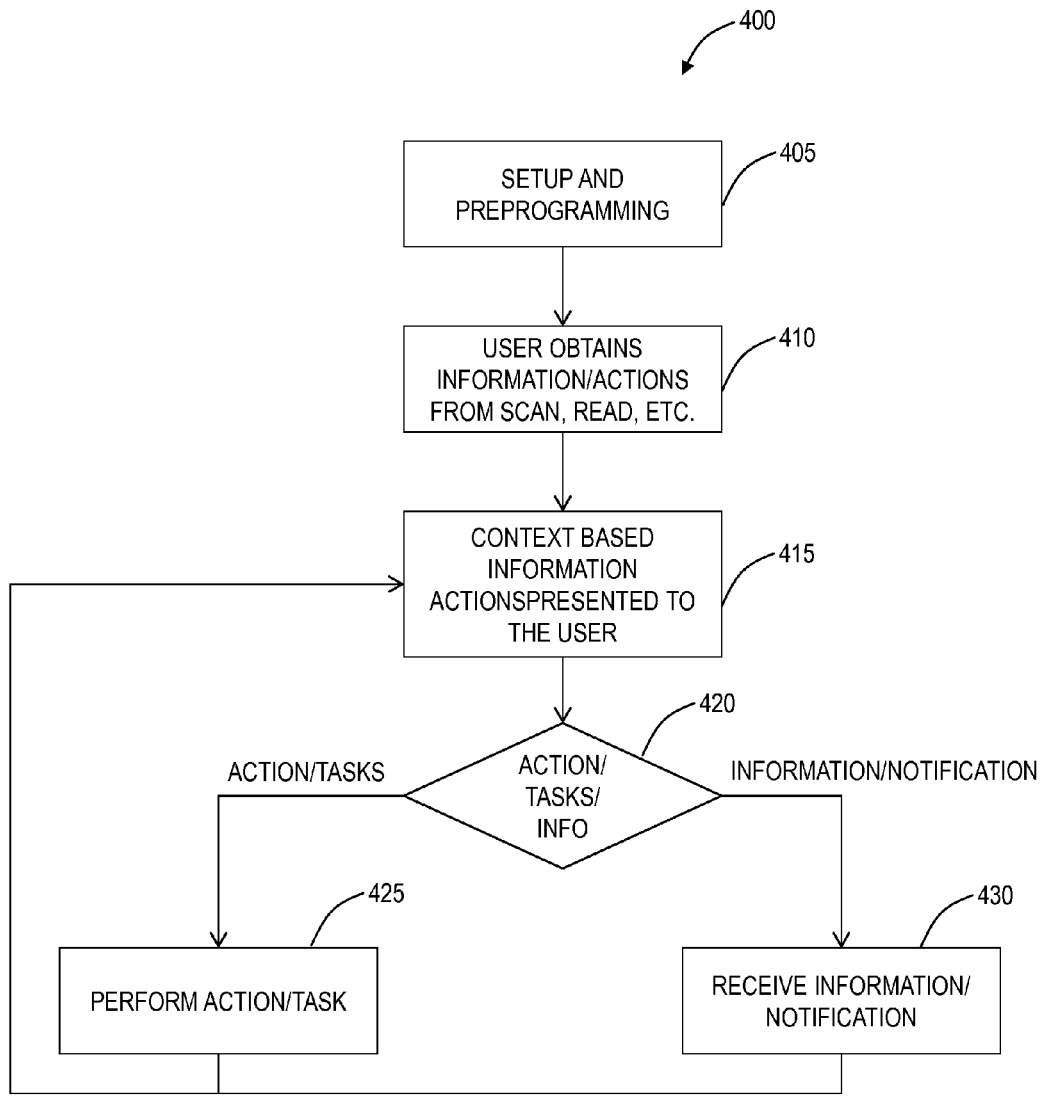
FIG. 4 is a flowchart of an end-to-end framework method utilizing the system of FIG. 1 for configurable, context based interactions in accordance with some embodiments.

Referring to FIG. 4, in an exemplary embodiment, a flowchart illustrates an end-to-end framework method 400 utilizing the system 100 for configurable, context based interactions. The end-to-end framework method 400 may be implemented with the system 100 including the mobile devices 110, the server 120, the network 130, the tags 140, the barcodes 150, and the other mechanisms 160. Variously, the end-to-end framework method 400 contemplates an interactive, context based approach to user's interactions with the environment, i.e. user's scan/read data associated with objects in the environment and interact based thereon. Further, the mobile devices 110 and optionally the server 120 may include a framework application operating thereon for implementation of the end-to-end framework method 400. The framework functionality may reside either wholly on the mobile devices 110 or the server 120, or be distributed therebetween.

First, the end-to-end framework method 400 includes setup and preprogramming (step 405). This may include, for example, physical deployment of the tags 140, the barcodes 150, and the other mechanisms 160 and associated objects. This may also include preprogramming of the tags 140, the barcodes 150, and the other mechanisms 160 along with preprogramming of the mobile devices 110 and the server 120. By preprogramming, data and/or instructions are provided to the various devices 110, 120, 140, 150, 160. For example, the tags 140, the barcodes 150, and the other mechanisms 160 may be preprogrammed with associated data related to their underlying object, such as type, price, location, quantity, stock-keeping unit (SKU), and the like. Alternatively, the preprogramming may include instructions for retrieving associated data from another source. The mobile devices 110 and the server 120 may be preprogrammed with software instructions for executing the end-to-end framework method 400.

A user, with the mobile device 110, obtains information from a scan, read, etc. of the tags 140, the barcodes 150, and the other mechanisms 160 (step 410). Here, the user is physically proximate to an object with an associated tag 140, barcode 150, and/or other mechanism 160, and the user obtains information and actions therefrom. Importantly, the obtaining of information and/or actions is said to be context based meaning the information and/or actions is based on location, type of user, time, day, type of underlying object, and/or any configurable attributes. For example, the context based information and/or actions may be different between users (e.g., customers, sales clerks, warehouse personnel, etc.), different between time/day (e.g., during operating hours, during restocking periods, etc.), and the like. In an exemplary embodiment, the underlying object is likely to be the main key to locating information and actions.

Put differently, the context based provides a mechanism that allows the end user to have direct access to the processes appropriate to their current circumstances with a minimum of data entry. This context leverages a plurality of attributes associated with a particular scan, read, etc., such attributes may include time/day, user type, object type, location, etc. The context further contemplates a plug-in based extensibility allowing new information and processes to be provided to the user without the usual burden of creating the screens and associated training that lead up to the new information/actions. The context may be determined through a combination of the mobile device 110, the server, the tags 140, the barcodes 150, and the other mechanisms 160. For example, location may be determined from the mobile device 110, user type may be pushed to the mobile device 110 from the server 120, and the like. In some cases (e.g., scan/read of a shelf label) the scanned object may provide the detailed location information since the exact location of the label is known and the user must be very close to it. If the framework executes on the server 120, then the user login (or other identification) would be the primary determining factor of "user type" and it would be known by the server 120 and used there without being "pushed" to the device.

The context based information and/or actions may be presented to the user (step 415). This may include through an output interface on the mobile device 110, e.g. a GUI, text, hyperlinks, etc. The end-to-end framework method 400 may be configured to present the user the most important items for the information and/or actions based on the context. For example, in addition to information, the end-to-end framework method 400 may present the user with actions, tasks, management, notification, etc. (step 420). These may generally be divided between information presented to the user and actions available to the user. Specifically, the end-to-end framework method 400 may include further steps of performing an action/task (step 425) or receiving information/notifications (step 430) and with additional context based information presented to the user (step 415). The "actions" presented to the user are GUI items that the user can select. Once selected the action associated with the item will occur (or the initial step leading to the occurrence will be done.). An example of the "initial step" case is "cleanup", where the cleanup operation would be scheduled by selecting the action rather than the action necessarily beginning immediately.

Formatting and presentation of information may be configurable and may depend on factors such as information available, area in which scan/read occurs, user role, time of day, calendar, etc. Formatting, ordering and presentation of actions may be configurable and may depend on factors such as actions and information available, area in which scan occurs, user role, time of day, calendar, etc. The actions will generally be found based on the information available. For example, an action to fetch item from store room is not unconditionally available and would only be available if the information for the item if the store room quantity was greater than zero.

Scan data used to lookup information and actions is a subset of the scan data—For a given type of scan data, one (or more) subsets of the scan data would be taken and used for lookups. Essentially, the scanned data may contain multiple fields that can each be used in various ways to lookup information. Identification of scans that have fields and how to extract those fields would be part of the system configuration. Scan data (or a subset of it) may be available directly as information. In some cases, the price as well as item code might be encoded in the barcode in different fields. The scanned price should be part of the information eligible to be displayed or used to locate actions. For looking up information, information may be resident on the mobile device 110 and/or the server 120 running the framework or the lookup may communicate with other computers via identified protocols (usually related to web services). The lookup operation may involve multiple lookups from local and remote sources of information to find all the associated pieces of information. For instance, scanning an item UPC might involve a number of separate sub-lookups to get each of the following pieces of information: price, country of origin, dairy-free status, next delivery, etc.

Variously, the end-to-end framework method 400 contemplates the creating of tasks, reporting problems, requesting information, etc. Most of the actions probably will be associated with the physical object, so for a shelf label the actions might be: create task for replenishment; create task for refacing or tidying up the presentation of the shelf/rack; report damage to shelf or items on shelf; request additional business information for the product: weekly sales, deliveries, look at stock levels in nearby stores; and the like. In some cases, the action may not be directly associated with the object, but may use other context information. For a shelf scan, there could be an action to create a cleanup task, where this location is automatically derived from the location of the shelf label. The action might also be to start a task associated with the thing that was just scanned. The exposed information and actions can also take into account the identity and permissions associated with the user so that only information and actions meaningful to the user are presented. The end-to-end framework method 400 contemplates a completely configurable framework. For example, any of the information/actions could be provided by the customer to meet their specific needs rather than just preprogrammed. Also, multiple separate organizations may not need to know about each other with the framework providing a common point of contact.

In an exemplary embodiment, the end-to-end framework method 400 may include actions, tasks, task/time management, and the like. The actions may include activity to respond to customer and/or environmental situations. These may include access to business tools, an ability to communicate or create tasks for others, an ability to create reminders for themselves and/or others, and the like. Relative to tasks, the end-to-end framework method 400 ensures a user with the mobile device 110 has a tool required to get the job done and limit its scope to the task at hand. Specifically, the mobile device 110 with the end-to-end framework method 400 may include a base or primary task, a possible interruption task, a possible secondary task, and the like. Relative to task/time management, the mobile device 110 with the end-to-end framework method 400 may enable a view and/or selection of tasks, an ability to get a next task, an ability to request and/or declare a break, and the like.

In the end-to-end framework method 400, actions and transient tools may be started manually, but usually may start in response to a scan, read, etc. Since these tools are easily started when needed, they may be automatically closed when a new tool is opened. Applications that are not driven by the scanner, reader, etc. activation are unlikely to be treated as transient application because of the time consumed to restart the applications. Non-scanner applications such as "create reminder" and "make walkie-talkie announcement" may be selected manually. The following table below outlines exemplary, non-limiting tools that may be started by a scanner, reader, etc. activation.

| Scan type | Example displayed info | Example Actions |
|---|---|---|
| Item UPC or carton | Item summary: Price SKU Location (shelf/backstock) Quantities (shelf/backstock/ on order) | Note-item needs restocking Request # items be brought to sales floor List associated tasks-allow expedite List weekly sales List different colors List different sizes |
| Shelf label barcode | Item summary: Price SKU Location (shelf/backstock) | Schedule item restocking Request # items be brought to sales floor Note-cleanup needed at this item loc. |

-continued

| Scan type | Example displayed info | Example Actions |
|---|---|---|
|  | Quantities (shelf/backstock/ on order) | List associated tasks-allow expedite List weekly sales List different colors List different sizes |
| Location barcode | Location summary: Readable coordinate Type of products | Schedule cleanup at this location. Summon associate covering this loc. Summon helper (large load lift/forklift spotter) Report maintenance issue Report safety issue |
| Employee badge | Employee summary: Name Shift status info List of equipment | Modify skills/preferences-manager Scan equipment to associate |
| Cage/pallet | Container summary: Purpose (storage/transit) Contents summary | List associated tasks-allow expedite Start top task for this cage/pallet Scan in new location for cage/pallet |
| Asset/tool/ device | Last owner Last used time/date Battery status | Scan in new owner for asset/tool Set self as new owner |
| Customer loyalty card | Unfulfilled orders Raincheck view/create | Previous purchase summary |
| Conference room | Room capacity Next opening | Schedule room now Schedule room later Similar available rooms |
| Industrial Equipment | Last service date Last repair date Last calibration date | Schedule immediate service Get replacement availability Get user procedures Get reference manual |

Being able to easily access the framework via a scan generates a number of requirements on the mobile device 110. For example, a separate scan and/or read button allows a scan/read operation to automatically trigger the framework at any point. The current application may be suspended, and the framework presentation takes over and when it is closed, the previous application may continue. A separate scan and/or read button allows the scan/read to occur at any point. Additionally, a soft scan button may take up space on every screen, or require the user to bring up a scan application before a scan could occur.

From a main screen of a transient application on the mobile device 110, there may include a mechanism to go forward to a more detailed screen (and back); a mechanism to go forward to perform a further action on the item just scanned/read; a mechanism to go back to the initial transient app display; a mechanism go back to the previous application (or another open application); and the like. For cases where the user might desire to manually enter a code, the mobile device 110 may include a mechanism for a manually launched application which allows barcode, RFID tag, etc. information to be entered via an on-screen keypad. Alternatively, the keypad entry could come up after some number of failed scan attempts, e.g. anticipating the need.

The mobile device 110 may allow a configurable number of task screens to be open. There may be one task screen for each task which is in-progress. If tasks are kept short and specific (10-15 minutes), then there is little reason to be doing several tasks in parallel. When the task screen is in the foreground, the screen and device are a dedicated tool to assist in doing the task. The task assistance may be limited to just the task.

For example, if the task is to unpack a particular tote, then the screen and scanner may step the worker through the process: 1) identify the correct tote (scan); 2) for each item in the tote (scan), locate the shelf position; and 3) record the number placed on the shelf and the number put to backstock. When a task is completed, the associated task screen may be replaced by the new task selection screen.

In an exemplary embodiment, a scan/read may occur shortly after another, which might imply that the user is looking for a comparison between two items. The comparison might generate additional information and therefore additional actions. For example, scanning/reading a bolt and then a nut might indicate whether the two are compatible.

Figure 5:
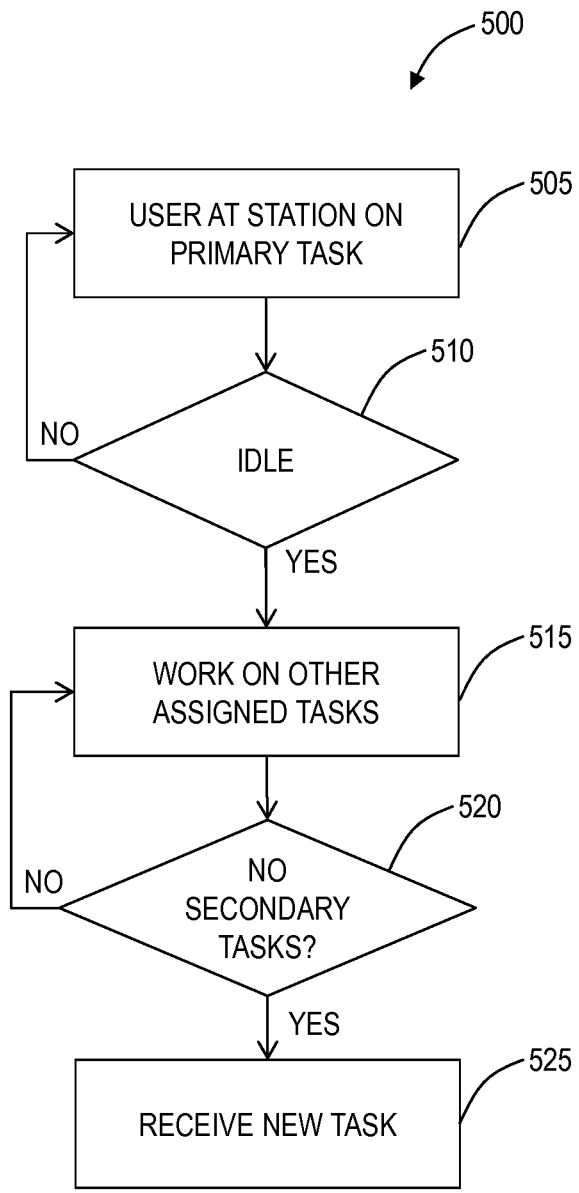
FIG. 5 is a flowchart of an exemplary usage method of a mobile device with the end-to-end framework method of FIG. 4 in accordance with some embodiments.

Referring to FIG. 5, in an exemplary embodiment, a flowchart illustrates an exemplary usage method 500 of the mobile device 110 with the end-to-end framework method 400. On the mobile device 110, the task/time management screen is the user's interface to the task management system which includes the scheduling of breaks. There are several ways that tasks can be doled out, so this screen may take several difference forms depending on the policy for this user. In an exemplary embodiment of the usage method 500, the policies may include support for the following situations. First, a user at a station on a primary task (step 505), e.g., a worker may have a primary assignment (cashier, cut fabric, help customers in plumbing, etc.), but when not busy with the primary assignment (step 510) they may work on other assigned tasks (report low shelf quantities, restock, etc.) (step 515). If the secondary task is not assigned (step 520), then the user may receive an assigned task (step 525).

For example, in a large retail operation, replenishment (from truck to shelf—or backstock) is broken down into hundreds of short duration tasks which are doled out to the workers one at a time according to worker skills and task priority. The tasks may include: moving pallets/cages from a truck; 2) movement of pallet/cage contents to aisles (or backstock); 3) movement of items from pallet/cage/tote in aisle to shelves; 4) and the like. A single truck delivery could have dozens of pallets/cages. Each of which could have dozens of totes or aisle level items. So the arrival of a truck may create hundreds of tasks. Unloading the truck may be the highest priority and allows the tasks associated with the movement of items in the store to become assignable.

In an exemplary embodiment, the end-to-end framework method 500 contemplates an autonomous self managed team, i.e. a list of tasks for the team could be displayed to everyone and as desired team members could claim (self assign) tasks. This would be most effective if the number of tasks were relatively small. Messages and self-authored "to dos" would also appear in the list.

The end-to-end framework method 500 may include a plurality of different ways to dole out tasks which depend on the level of autonomy the users have. For example, the degree of visibility into future tasks depend on how tasks are doled out and how dynamic the tasks are. The delivery of tasks may be performed by the server 120 and may include delivery of the task to a user with integrated tools to assist in performing the task. Also, the end-to-end framework method 400 may include ad-hoc user generated tasks and self generated reminders. In a process driven operation, these would amount to a small proportion of the total number of task.

In an exemplary embodiment, the end-to-end framework method 500 and/or the system 100 may include an application framework which supports the applications and behaviors the user depends on. The application framework allows the user to run multiple web applications at the same time and switch between the applications easily, such as on the mobile device 110. The applications are really separate web sessions that each appear as separate applications to the user, e.g. web sessions hosted through the server 120. The application framework may provide login and device association, startup of initial set of applications, switching between different application displays, arbitration of access to shared resources (scanner, reader, and buttons), any gesture processing and take appropriate action, and the like. Of note, the server 120 can be any server, not just a dedicated server associated with the framework.

Given the relatively static nature of traditional task management systems, the tasks are scheduled well ahead of time and can include tasks of long (hours) duration, like changing out seasonal merchandise. In an exemplary embodiment, the system 100 assumes each user has one of the mobile devices allowing a more dynamic view of task management. For example, tasks may be shorter (less than 30 minutes). This allows better employee metrics, but also allows parallelism and multiple clean hand-off points if someone else takes over. Tasks may be dynamically assigned according to priority Advantageously, tasks cause the business to run in an efficient and timely fashion. This includes the worker cleaning up spill or restocking a shelf as well as the manager assigned to approve a credit application or address customer complaint. The tasks may be viewed as a dynamic best-guess list, doled of one-at-a-time.

A message to a worker/manager appears in their queue and if urgent may interrupt them. A message has a life-cycle just like a task. When a worker creates a reminder, it is just a message to themselves and appears in the same queue and may be nagging if its priority is high. In summary, everything that a worker/manager needs to do, read, respond to appears in the same prioritized list.

Anytime a task is being assigned across multiple people, it would be best if the tasks matched the worker. If user records are being updated by a supervisor, then user skill/training/preferences could be used to choose task. Within the priority constraints, a worker could be allowed to request an alternate task if they don't want the assigned one. Or, workers could be given a short list of possible next tasks to choose from. Task management is often imagined as the manager assigning tasks to the workers. But in a business process oriented task management system, the workers would also be assigning tasks to the manager/supervisor, such as, for example credit approval needed, void/over-ride on a cash register, customer issue escalation, etc. The manager may be a scarce commodity than the workers and therefore may be assigned many short duration tasks that keep the business moving.

Figure 6:
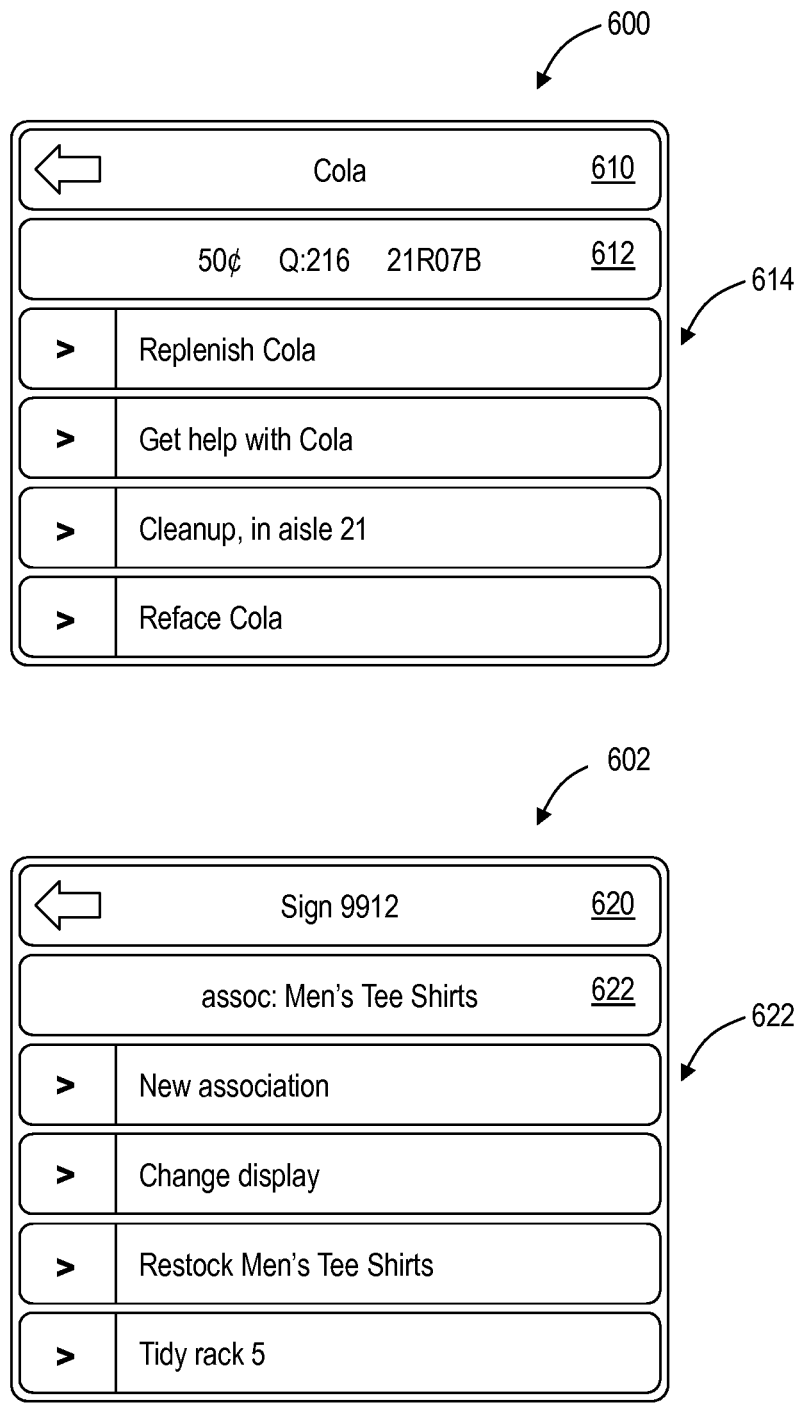
FIG. 6 is screen diagrams of exemplary screen shots from a mobile device utilizing the end-to-end framework method of FIG. 4 in accordance with some embodiments.

Referring to FIG. 6, in an exemplary embodiment, screen diagrams 600, 602 illustrate exemplary screen shots from a mobile device 110 utilizing the end-to-end framework method 400. The screen diagram 600 is displayed subsequent to scanning or reading an item, i.e. cola, and the screen diagram 602 is displayed subsequent to scanning or reading a digital sign, i.e. sign 9912. Although only a shelf label, i.e. cola, and a digital sign, i.e. sign 9912, are shown, the list of things that could be scanned for information and actions is unlimited. Some examples may include a digital sign, electronic shelf label, a shelf label, a UPC, an International Standard Book Number, a cage identification barcode or RFID, a cash register, a returns cart, a customer loyalty card, etc.

After scanning or reading cola 610, the screen shot 600 displays select attributes 612, e.g. cost, quantity, location, etc. and some exemplary tasks 614. A first task 614 may include "replenish cola" which may be used to create a new task to restock the cola 610. A second task 614 may include "get help with cola" which may bring up additional information. A third task 614 may include "cleanup, in aisle 21" which may create a new task to indicate cleanup is required in the aisle with the soda 610. Yet another task 614 may include "reface, cola in aisle 21" which may create a new task to indicate the cola 610 needs to be refaced. Selection of any of the tasks 614 may communicate with the server 120 and with other devices 110 for creating new tasks.

After scanning or reading a digital sign 620, the screen shot 602 displays select attributes 622, e.g. what is associated with the sign 620, i.e. Men's Tee Shirts, and some exemplary tasks 624. The exemplary tasks 624 may include "New association" which modifies what items are associated with the digital sign 620, "change display" to create a new task to change the display of the digital sign 620, "restock Men's Tee Shirts" to create a new task, and "tidy rack 5" to create a new task to clean up the rack associated with the digital sign 620.

Figure 7:
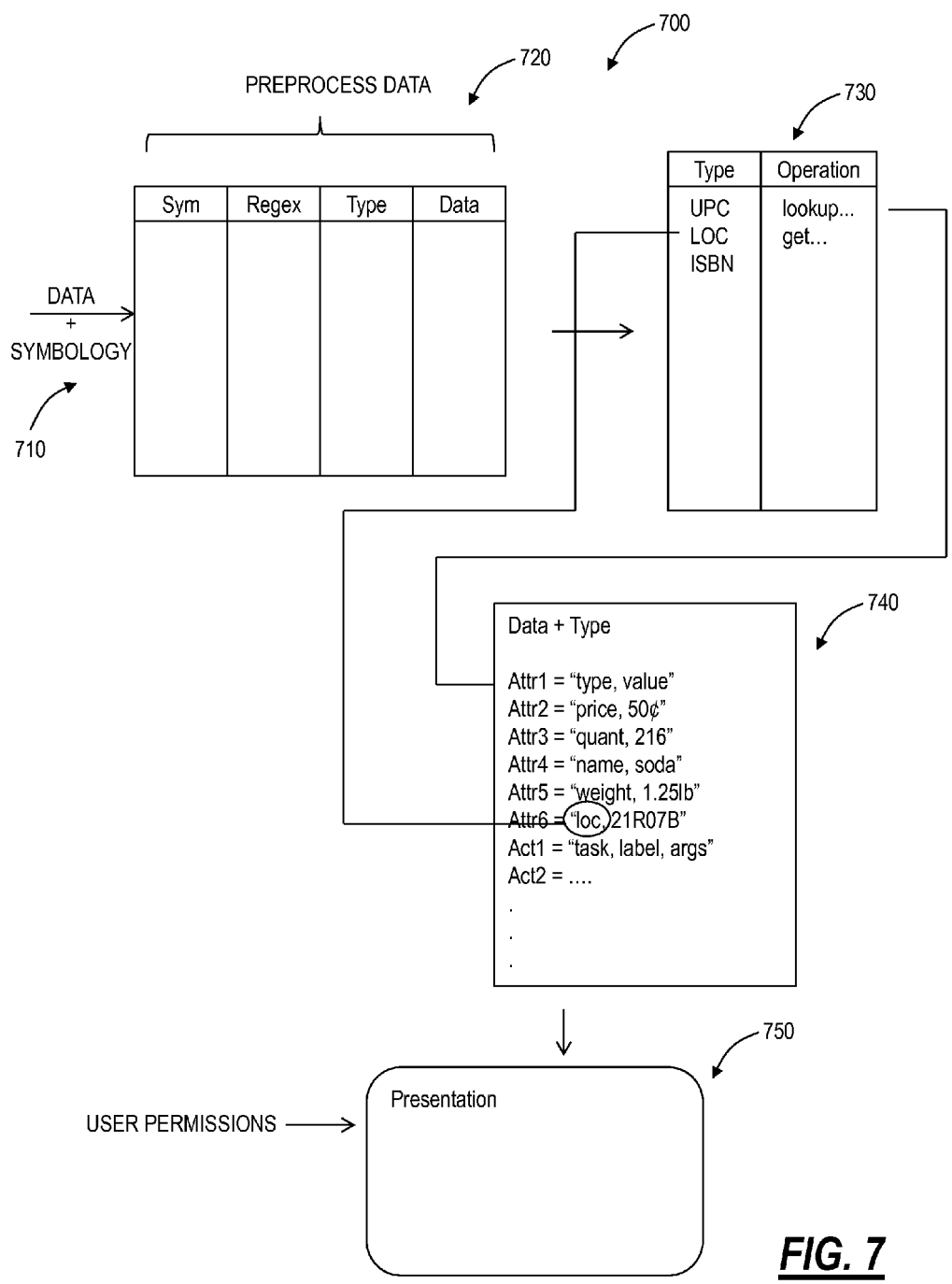
FIG. 7 is a dataflow diagram of management of data in the end-to-end framework method of FIG. 4 with the system of FIG. 1 in accordance with some embodiments.

Referring to FIG. 7, in an exemplary embodiment, a dataflow diagram illustrates management 700 of data in the end-to-end framework method 400 with the system 100. First, data and symbology 710 is input to preprocessed data 720. Here, data is input into the mobile devices 110, the server 120, the tags 140, the barcodes 150, and the other mechanisms 160. This step is an initial setup where data is imported or setup up for the end-to-end framework method 400. Next, actions 730 are variously defined. These may include default and custom actions. For each action 730, attributes 740 are defined with data, type, etc. that may be displayed to a user on the mobile device 110, based on the user's permissions. In operation, the management 700 enables a flexible, dynamic configuration for a user to interact with the end-to-end framework method 400. That is, the interaction is not static, but is adaptable in context.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   reading, by a scanner on a mobile device, an indicia affixed to an object in a store in order to obtain information associated with that object;
   deriving an identity of a user of the mobile device and permissions associated with the user;
   obtaining a plurality of available tasks for that user to perform based on the information associated with the object, and the identity and permissions of the user;

displaying the plurality of available tasks to perform on the mobile device; and selecting, by the user on the mobile device, one of the plurality of available tasks to perform.

2. The method of claim 1, wherein the indicia are one of a bar code and an radio frequency identification device.

3. The method of claim 1, wherein in the deriving step the identity is of an employee of the store, and wherein the plurality of tasks displayed to the employee involve inventory management functions related to that object.

4. The method of claim 1, wherein in the deriving step includes deriving a location of the object from the information, and wherein the identity is of an employee of the store, and wherein the plurality of tasks for the employee to perform that are only related to a location of that object but not directly associated with the object itself.

5. The method of claim 1, wherein the identity is of a customer of the store, and wherein the plurality of tasks comprise functions to obtain further information related to that object.

6. The method of claim 1, wherein the information includes an amount of inventory for the object.

7. A system, comprising:
a reader in a mobile device operable to read an indicia affixed to an object in a store in order to obtain information associated with that object;
the mobile device configured to derive an identity of a user of the mobile device and permissions associated with the user; and
an application operable on the mobile device to obtain a plurality of available tasks for that user to perform based on the information associated with the object, and the identity and permissions of the user and display the plurality of available tasks to perform for selection by the user on the mobile device of one of the plurality of available tasks to perform.

8. The system of claim 7, wherein the available tasks obtained depends on the day and time of the reading.

9. The system of claim 7, wherein the identity includes defining a user of mobile device using a user login procedure.

10. The system of claim 7, wherein the display of tasks is formatted according to the day, time, and type of user.

11. The system of claim 7, wherein the identity is of an employee, and wherein the application is further operable to obtain store room quantities for that object to modify one of the available tasks displayed to the user.

12. A mobile device, comprising:
an indicia reader operable to read an indicia affixed to an object in a store in order to obtain information associated with that object;
a network interface;
a data store; and
a processor, wherein each of the reader, the network interface, the data store, and the processor are communicatively coupled therebetween;
wherein the processor is configured to:
derive an identity of a user of the mobile device and permissions associated with the user;
obtain a plurality of available tasks for that user to perform based on the information associated with the object, and the identity and permissions of the user; and
present the plurality of available tasks to perform to an output interface of the mobile device for selection by the user of one of the plurality of available tasks to perform.

13. The mobile device of claim 12, wherein the identity is of a manager, and wherein the plurality of tasks include tasks for other employees related to that object.

* * * * *